United States Patent Office 3,565,974
Patented Feb. 23, 1971

3,565,974
CROSS-LINKING METHOD OF CHLORINATED POLYETHYLENIC RUBBERY COPOLYMERS
Tohru Ohnuma, Yokohama-shi, and Hideomi Higuchi, Tokyo, Japan, assignors to Showa Denko Kabushiki Kaisha, Tokyo, Japan
No Drawing. Filed Oct. 13, 1967, Ser. No. 675,057
Int. Cl. C08f 15/00, 15/40
U.S. Cl. 260—878                                  10 Claims

ABSTRACT OF THE DISCLOSURE

Method of cross-linking chlorinated polyethylene which comprises copolymerizing from 80 to 99 parts by weight of chlorinated polyethylene and from 20 to 1 part by weight of a member selected from the group consisting of acrylonitrile and a mixture of acrylonitrile and styrene to provide a rubbery copolymer and heating said rubbery copolymer with the addition of a cross-linking agent in the presence or absence of an accelerator.

BACKGROUND OF THE INVENTION (1) Field of the invention

The present invention relates to a cross-linking method of a rubbery copolymer prepared by the copolymerization of chlorinated polyethylene and acrylonitrile or by the copolymerization of chlorinated polyethylene and a mixture of acrylonitrile and styrene.

More particularly, the invention relates to a method of preparing a useful cross-linked material particularly excellent in processability in a processing machine for rubbers, as well as having excellent properties in oil resistance, solvent resistance, weather-proofing, ozone resistance, chemical resistance, thermal aging resistance, and flame resistance by reacting with a cross-linking agent a rubbery copolymer prepared by the copolymerization of chlorinated polyethylene and acrylonitrile or a mixture of acrylonitrile and styrene.

(2) Description of the prior art

It has hitherto been known that a cross-linked material having an excellent weather-proofing and ozone resisting properties as well as good mechanical properties can be obtained by cross-linking chlorinated polyethylene. However, since such a conventional cross-linked material of chlorinated polyethylene is deficient in oil resistance and solvent resistance, there are such faults that such a conventional material is unsuitable for the purposes wherein the aforesaid properties are required and also the processability in a rubber processing machine is deficient.

These faults cannot be improved by only changing the conditions for producing chlorinated polyethylene. For instance, if the content of chlorine in the chlorinated polyethylene is increased, the oil resistance and the solvent resistance thereof may be improved to some extent, but such a chlorinated polyethylene containing chlorine in a ratio to provide good oil resistance and good solvent resistance is a very hard resinous material and shows no rubbery properties.

These faults are based on the fact that polyethylene is used as a raw material and hence the case is quite different from the case of other various synthetic rubbers prepared directly from monomers.

Therefore, an object of the present invention is to provide a method of preparing a cross-linked material of a polyethylenic rubbery copolymer having improved properties and having none of the aforesaid faults. Another object of this invention is to provide a cross-linked material of a polyethylenic rubber copolymer having none of the faults as mentioned above.

SUMMARY OF THE INVENTION

The inventors have found, as the result of various investigations, that a cross-linked material having improved properties can be prepared by copolymerizing 80–90 parts by weight of chlorinated polyethylene with 20–1 parts by weight of an acrylonitrile monomer or a mixture of acrylonitrile and styrene to provide a rubber copolymer and then heating the resulting copolymer with the addition of a cross-linking agent.

Considered from the view point of ease of the chlorination procedure, elasticity of the cross-linked material and processability of the same, it is preferable that the polyethylene used for preparing the chlorinated polyethylene in the process of this invention is a linear polyethylene having a density of at least 0.93 or a copolymer of ethylene and less than 10 parts by weight of butene-1 or propylene, for example, one having High Load Melt Index of about 1–10 g./10 min. (Load: 21.6 kg.). The chlorination of the polyethylene may be conducted in a heterogeneous system, in particular, in an aqueous suspension system. The chlorinated polyethylene used as the raw material of this invention includes, e.g., (1) one prepared by introducing a chlorine gas into an aqueous suspension system of polyethylene to chlorinate the polyethylene at a high temperature (above 100° C.), if necessary, by using an emulsifying agent and in the presence of a catalyst, such as, a peroxide, ultraviolet rays and the like, (2) one prepared by swelling the polyethylene with a solid aromatic hydrocarbon at normal temperature in an aqueous suspension thereof and then chlorinating the thus swelled polyethylene at a temperature of 50–100° C., and (3) one prepared by chlorinating the polyethylene in the vapor phase. A particularly preferable elasticity can be obtained when the content of chlorine in the chlorinated polyethylene thus prepared is 25–50% by weight.

The chlorinated polyethylenic rubbery copolymer which is an intermediate product in the process of this invention may be prepared by copolymerizing 80–99 parts by weight of the chlorinated polyethylene prepared by any of the aforesaid method with 20–1 parts by weight of acrylonitrile alone or a mixture of acrylonitrile and styrene. In the case of copolymerizing the chlorinated polyethylene with a mixture of the monomers of acrylonitrile and styrene, it is preferable that the content of the acrylonitrile monomer in said monomer mixture be higher than 50%.

The copolymerization reaction may be carried out by adding acrylonitrile or a mixture of acrylonitrile and styrene directly to the chlorinated polyethylene or a solution of the chlorinated polyethylene in a solvent or a solvent mixture of chloroform, carbon tetrachloride, ethane dichloride, trichloroethane, chlorobenzene, toluene or benzene and then heating the system with the addition of a conventional polymerization catalyst, such as, benzoyl peroxide or azobis-isobutylonitrile. In this case, the reaction temperature is 40–150° C., preferably, 90–120° C. Furthermore, the copolymerization reaction may be conducted while irradiating the reaction mixture with ionizing high energy rays or ultraviolet rays. More preferably, the copolymerization reaction may be conducted in an aqueous suspension system containing a dispersing agent, such as, calcium phosphate or sodium dodecylbenzenesulfonate.

The composition thus prepared is a homogenous rubbery copolymer. If the contents of acrylonitrile and styrene in the copolymer are increased, the oil resistance, dimensional stability and processabiilty of a cross-linked product of the rubbery copolymer obtained by cross-linking the copolymer in accordance with the process of this invention may be improved, but, on the other hand, the elasticity thereof is reduced and hence the modulus is increased. However, if the content of acrylonitrile or the contents of acrylonitrile and styrene is higher than 20% by weight, the cross-linked product is in a state of resinous composition deficient in elasticity. Hence it becomes impossible to process the product by a rubber processing machine. Further, since the addition of acrylonitrile improves the oil resistance of the cross-linked product and also the addition of styrene improves the processability, the mixing ratio of acrylonitrile and styrene to be incorporated in the rubbery copolymer is properly selected according to the desired uses of the cross-linked product.

As the cross-linking agent used for cross-linking the rubbery copolymer prepared as above, there are illustrated a polyamine such as hexamethylenediamine or xylenediamine; dihydric or polyhydric epoxide; a thiourea compound such as an alkylthiourea or an alkylene thiourea; an organic peroxide, and a hydrogen chloride acceptor such as magnesium oxide, lead monoxide.

In this case, it is more effective and desirable to use along with the cross-linking agent a thiuram series accelerator, such as, tetramethylthiuram disulfide or dipentamethylenethiuram tetrasulfide. Furthermore, in the case of using an organic peroxide as the cross-linking agent, it is extremely effective to use together a polyallyl compound such as triallyl isocyanurate, triallyl cyanurate or diallyl phthalate.

Moreover, in the process of this invention, there may be added, besides the foregoing accelerators, various stabilizers conventionally used in polyvinyl chloride and also various fillers, softening agents and plasticizers used in synthetic rubber products. Furthermore, other synthetic rubbers, natural rubbers and the like may be mixed in the product of this invention.

Then, the cross-linking step of this invention will be explained below. First of all, the rubbery copolymer thus obtained is supplied to a two-roll rubber mixer having the surface temperature of 60–100° C., while adding thereto a filler, a cross-linking agent, a softening agent and the like, whereby these components are thoroughly mixed. In this case, since the composition has good processability, the mixing procedure can be easily conducted by other means than the two-roll rubber mixer, such as, a Banbury mixer or an extruding machine. The composition thus obtained was subjected to a cross-linking reaction for about 5–60 minutes at a temperature of 150–200° C., under high pressure or normal pressure.

The cross-linked product of this invention, thus prepared, not only has a very excellent processing property but also excellent oil resistance, solvent resistance, ozone resistance, chemical resistance, thermal aging resistance and flame resistance. Therefore, the product can be very suitably employed for producing various rubber articles, such as, rubber hoses, rubber belts, rubber rolls, industrial rubber articles, rubber-coating materials for electric cables, and the like.

DETAILED DESCRIPTION OF THE INVENTION

The practice of the invention will now be explained by the following examples.

EXAMPLES 1–7

The rubbery copolymer having the composition as shown in the upper rank of the following table was supplied to a two-roll rubber mixer having the surface temperature of about 80° C., and then the rubbery copolymer was mixed with the cross-linking agent, the filler, the stabilizer and the plasticizer as shown in the middle rank of the same table to provide a compound shown in the same rank, from which a sheet of a thickness of about 2 mm. was formed. The composition was heated for 45 minutes in a metallic mold of 155° C., with or without conducting an extrusion test by means of an extruding machine for rubber.

In the same way, a cross-linked product was prepared from a chlorinated polyethylene containing neither acrylonitrile nor styrene (Comparative Examples 1–3).

The samples thus obtained were subjected to a tensile test (ASTMD–412) and an oil resistance test according to the process of ASTMD–471. Also, an ozone resistance test was conducted in an atmosphere containing 50 p.p.m. of ozone. These results are also shown in the following table.

In addition, with regard to Example 1 and Comparative Example 1, the uncross-link compositions containing the various reaction components were subjected to an extrusion test by means of a rubber extruder of 38 mm. in diameter under the conditions of 80° C., head temperature, and 20 r.p.m. The extrusion rate was 3.2 m./min. in Comparative Example 1, whereas it was 4.1 m./min. in Example 1 and also the extrusion swelling was 43% in Example 1, whereas it was 14% in Comparative Example 1, which showed that the composition of this invention has very excellent processability.

Thus, as is clear from the results shown in the table, the cross-linked product obtained by the process of this invention had very excellent oil resistance and mechanical properties as compared with conventional cross-linked product obtained by the procedures shown in the comparative examples.

TABLE 1

| Copolymer | Example of invention | | | | | | | Comparative example | | |
|---|---|---|---|---|---|---|---|---|---|---|
| | 1 | 2 | 3 | 4 | 5 | 6 | 7 | 1 | 2 | 3 |
| Chlorinated polyethylene (percent) | 90 | 95 | 85 | 89 | 90 | 85 | 82 | 100 | 100 | 100 |
| Chlorine content (percent) | 40 | 40 | 40 | 40 | 40 | 40 | 30 | 40 | 30 | 40 |
| Acrylonitrile (percent) | 9 | 3 | 12 | 11 | 9 | 12 | 13 | 0 | 0 | 0 |
| Styrene (percent) | 1 | 2 | 3 | 0 | 1 | 3 | 5 | 0 | 0 | 0 |

TABLE 2

| Copolymer | Example of invention | | | | | | | Comparative example | | |
|---|---|---|---|---|---|---|---|---|---|---|
| | 1 | 2 | 3 | 4 | 5 | 6 | 7 | 1 | 2 | 3 |
| Copolymer (percent) | 100 | 100 | 100 | 100 | 100 | 100 | 100 | 100 | 100 | 100 |
| SRF carbon black (percent) | 70 | 70 | 70 | 70 | | | 70 | 70 | 4 | |
| Dioctyl phthalate (percent) | 30 | 30 | 30 | 30 | 20 | 20 | 30 | 30 | 30 | 20 |
| Magnesia (percent) | 10 | 10 | 10 | 10 | | | 10 | 10 | 10 | |
| Ethylene thioura (percent) | 4 | 4 | 4 | 4 | | | 4 | 4 | 4 | |
| Hakuenka CC [1] | | | | | 70 | 70 | | | | 70 |
| Epicoat 828 [2] (percent) | | | | | 5 | 5 | | | | 5 |
| Dicumyl peroxide (percent) | | | | | 1.2 | 1.2 | | | | 1.2 |
| Triallyl isocyanate (percent) | | | | | 3 | 3 | | | | 3 |

[1] Surface treated calcium carbonate (made by Shiraishi Kogyo K.K.).
[2] Epoxy resin (made by Shell Petroleum Co.).

TABLE 3

| Copolymer | Example of invention | | | | | | | Comparative example | | |
|---|---|---|---|---|---|---|---|---|---|---|
| | 1 | 2 | 3 | 4 | 5 | 6 | 7 | 1 | 2 | 3 |
| 100% modulus (kg./cm.$^2$) | 53 | 48 | 64 | 57 | 24 | 27 | 49 | 41 | 34 | 18 |
| Tensile strength (kg./cm.$^2$) | 147 | 138 | 143 | 136 | 187 | 183 | 133 | 132 | 126 | 174 |
| Elongation (percent) | 370 | 390 | 360 | 370 | 470 | 480 | 430 | 410 | 450 | 530 |
| Volume swell (percent)[1] | 23 | 35 | 17 | 15 | 21 | 19 | 38 | 53 | 82 | 47 |
| Ozone resistance test (hours to first crack) | 50 | 50 | 50 | 50 | 50 | 50 | 50 | 50 | 50 | 50 |

[1] ASTM No. 3 Oil; 70 hours. at 100° C.

What is claimed is:

1. A cross-linked rubbery copolymer produced by the process which comprises copolymerizing from 80 to 99 parts by weight of a normally solid chlorinated polyethylene having a chlorine content of from about 25 to about 50% by weight with from 20 to 1 parts by weight of a member selected from the group consisting of acrylonitrile and a mixture of acrylonitrile and styrene, said mixture comprising greater than 50% by weight of acrylonitrile, and said polymerization being conducted under free radical polymerization conditions at a temperature of from about 40 to about 150° C., to thereby provide a rubbery copolymer; and cross-linking said resultant rubbery copolymer with a cross-linking agent.

2. The cross-linked rubbery copolymer of claim 1 wherein said chlorinated polyethylene is prepared by the chlorination of a member selected from the group consisting of linear polyethylene having a density of at least 0.93, a copolymer of ethylene and less than 10 parts by weight of butene-1 and a copolymer of ethylene and less than 10 parts by weight of propylene.

3. The cross-linked rubbery copolymer of claim 2 wherein said copolymer of ethylene has a High Load Melt Index of from about 1 to about 10 g./10 min.

4. The cross-linked rubbery copolymer of claim 1 wherein said chlorinated polyethylene has been prepared by introducing a chlorine-containing gas into an aqueous suspension of polyethylene to thereby chlorinate the polyethylene at a temperature above 100° C.

5. The cross-linked rubbery copolymer of claim 1 wherein said cross-linking agent is selected from the group consisting of an epoxide, a polyamine, a thiourea compound, an organic peroxide and a hydrogen chloride acceptor.

6. The cross-linked rubbery copolymer of claim 5 wherein said thiourea is ethylene thiourea.

7. The cross-linked rubbery copolymer of claim 5 wherein said peroxide is dicumyl peroxide.

8. The cross-linked rubbery copolymer of claim 7 wherein said cross-linking is conducted at a temperature of from about 150 to about 200° C. for from about 5 to about 60 minutes.

9. The cross-linked rubbery copolymer of claim 8 wherein said cross-linking is further conducted in the presence of a cross-linking accelerator.

10. The cross-linked rubbery copolymer of claim 9 wherein copolymerization is conducted in an aqueous suspension.

References Cited
UNITED STATES PATENTS

| | | | |
|---|---|---|---|
| 3,022,276 | 2/1962 | Orthner et al. | 260—79.3 |
| 3,050,503 | 8/1962 | Natta et al. | 260—79.3 |
| 3,076,781 | 2/1963 | Frey | 260—45.5 |
| 3,110,709 | 11/1963 | Canterino | 260—94.9 |
| 3,345,315 | 10/1967 | Barton et al. | 260—23 |
| 3,351,677 | 11/1967 | Barton et al. | 260—889 |

JOSEPH L. SCHOFER, Primary Examiner

S. M. LEVIN, Assistant Examiner

U.S. Cl. X.R.

260—41, 94.9